July 29, 1958 J. E. BROOK 2,845,528

DIVIDING AND LIMITER CIRCUIT

Filed March 17, 1953

INVENTOR.
JAMES EDWARD BROOK
BY
Oscar B. Brumback
ATTORNEY

United States Patent Office 2,845,528

Patented July 29, 1958

2,845,528

DIVIDING AND LIMITER CIRCUIT

James E. Brook, Hackensack, N. J., assignor to Bendix Aviation Corporation, Teterboro, N. J., a corporation of Delaware Application March 17, 1953, Serial No. 342,953

4 Claims. (Cl. 250—27)

This invention relates generally to electrical circuits and more particularly to dividing and limiting circuits.

In control systems and computers it is frequently necessary to develop an electrical signal corresponding to the quotient or ratio of two signals. This has been accomplished previously by using electromechanical systems, such as a motor driven gear train and potentiometer combination. These former systems, however, had the disadvantages of a relatively long time lag in operation and of spatial requirements for containing the unit. Also, it is frequently desirable to have the maximum value of a signal limited. Previous devices have had the disadvantage of being restricted to a particular phase relationship of the signal.

An object of the present invention, therefore, is to provide a simple electronic system for producing an output corresponding to the ratio of two inputs.

Another object is to provide a novel device which does not depend on moving parts for developing an output corresponding to the ratio between two inputs.

A further object is to provide a novel device for limiting the maximum strength of a signal.

The foregoing and other objects and advantages of the invention will appear more fully hereinafter from a consideration of the detailed description which follows, taken together with the accompanying drawing wherein one embodiment of the invention is illustrated by way of example. It is to be expressly understood, however, that the drawing is for the purpose of illustration and description only, and is not intended as a definition of the limits of the invention.

Figure 1:
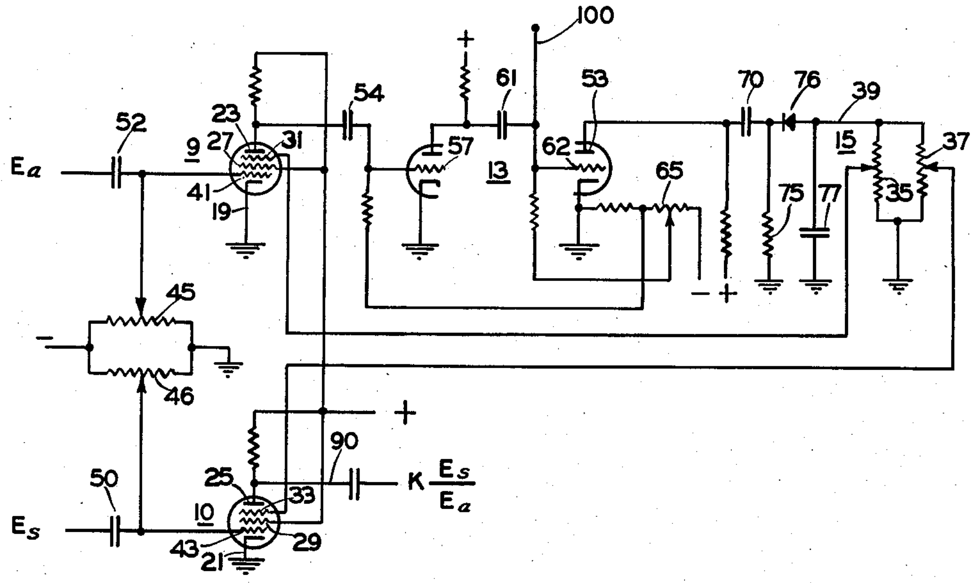
Figure 1 shows a complete schematic wiring diagram for the novel dividing circuit of the present invention.

The novel dividing circuit is comprised essentially of two sections; substantially similar vacuum tubes 9 and 10 of the type known as pentodes, a two stage amplifier 13 which may be a twin triode vacuum tube, and a rectifier and filter section 15.

Pentodes 9 and 10 have substantially similar connections: cathodes 19, 21 are grounded; plates 23, 25 and screen grids 27, 29 are connected to a common source of direct current potential; suppressor grids 31, 33 are connected across potentiometers 35 and 37 which are energized by way of a lead 39; and control grids 41, 43 are biased by potentiometers 45 and 46 which are connected to a common source of direct current potential.

The dividend or signal $E_s$ to be divided is impressed across blocking condenser 50 to grid 43 of pentode 10, and the divisor signal $E_a$ is coupled across condenser 52 to the grid 41 of pentode 9. The output from plate 23 is coupled across blocking condenser 54 to the grid 57 of amplifier 13 where the signal from one stage of amplification is coupled across blocking condenser 61 to the grid 62 for a second stage of amplification. This second stage is biased by potentiometer 65 to cut off at a desired threshold signal level. The signal from the second stage is applied across blocking condenser 70 to the rectifier and filter network 15. This network may be comprised of a resistor 75, a germanium diode rectifier 76, and a capacitance 77. The rectified D. C. output is applied by way of lead 39 across potentiometers 35 and 37 whose wipers are connected to the suppressor grids 21, and 33 of pentodes 9 and 10.

Figure 2:
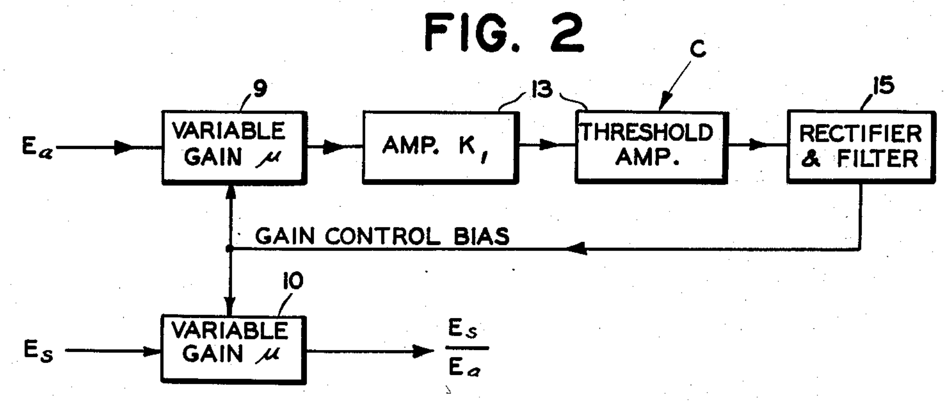
Figure 2 shows a functional block diagram of the novel circuit of Figure 1.

The operation of this system may best be understood by referring to the block diagram of Figure 2. Here pentodes 9 and 10 are shown as variable gain or variable $\mu$ amplifiers, the two stage amplifier 13 as being comprised of a gain stage and a threshold stage, and the output of rectifier filter section 15 as controlling the gain or $\mu$ of tubes 9 and 10.

The closed loop in Figure 2 is an automatic gain control circuit which maintains the relation $\mu K_1 E_a = C$ over its operating range, where $\mu$ is the gain of tube 9, $K_1$ is the gain of the first stage of amplifier 13, C is the threshold value of the second stage of amplifier 13.

Inasmuch as the characteristics of tubes 9 and 10 are substantially the same, then for a particular gain control bias the $\mu$ of tube 10 will be equal to the $\mu$ of tube 9. The input of tube 10 is $E_s$. The value of $\mu$ from the equation above as determined by the closed loop is $C/K_1E_a$. Hence the output of tube 10 is $$\frac{C}{K_1}\frac{E_s}{E_a}$$

i. e., the desired quotient multiplied by a constant $$\left(\frac{C}{K_1}\right)$$

Turning now to the operation of the structure shown in Figure 1, when a signal $E_A$ is applied to the grid 41 of pentode tube 9, the resulting output is applied to tube 13 for two stages of amplification. When the signal is greater than the threshold value of the second stage of amplification, the output from plate 53 is applied across the filter and rectifier circuit 15 and results in a direct current output from this section which is fed back to the suppressor grid 31 of pentode tube 9.

This feedback signal lowers the gain of tube 9 so that a signal from the first to second stages of amplification in tube 13 will be at the threshold value of the second stage. The same feedback signal also appears on the suppressor grid 33 of pentode 10 so that the output of tube 10 will vary as the ratio $$\frac{E_S}{E_A}$$

In servo systems it is frequently desirable to limit the maximum amplitude of a signal; and the closed loop portion of this circuit, Figure 2, may be utilized as a voltage limiter. The signal $E_a$ produces a voltage at terminal 100 which is limited to the D. C. threshold voltage C which may be precisely regulated by potentiometer 65. Should this threshold value be exceeded, the feedback from potentiometer 35 lowers the gain of tube 9 so that the output at terminal 100 does not exceed the threshold value. The advantage of this circuit is that the limiting action does not depend upon a particular phase or frequency for the signal $E_a$.

It will be apparent that the foregoing has presented a novel circuit for developing an output signal which is a function of the ratio of two input signals. The circuit requires no moving parts, and its response to the input signals is almost immediate since the only time delay is that inherent in the filter circuit. The novel circuit may also be used as a signal limiter or as a limiter and divider if desired.

The above and other objects and advantages of the invention will appear more fully hereinafter from a consideration of the detailed description which follows, taken together with the accompanying drawing wherein one embodiment of the invention is illustrated by way of example. It is to be expressly understood, however, that the drawing is for the purpose of illustration and description only, and is not intended as a definition of the limits of the invention.

I claim:

1. An electrical circuit for producing a signal corresponding to a ratio of two signals comprising a first vacuum tube having a control grid for receiving one of said signals, a suppressor grid, and a plate for developing a first output corresponding to said signal, an amplifier for receiving said first output and developing a second output when said first output exceeds a threshold value, rectifier and filter means responsive to said second output for developing a regulating output, means for applying said regulating output to said suppressor grid whereby said first output is limited to said threshold value, and a second vacuum tube having a control grid for receiving said other signal, a suppressor grid for receiving said regulating signal, and a plate for developing a third output, whereby said third output corresponds to said ratio.

2. An electrical circuit for producing a signal corresponding to the ratio of two signals, comprising first and second variable gain amplifiers having control grid, suppressor grid and anode elements, said first variable gain amplifier receiving one signal at its control grid and developing a first amplified output at its anode, means responsive to said first amplified output for developing a second output when said first amplified output exceeds a predetermined threshold value, means applying said second output to the suppressor grid of said first amplifier so that said suppressor grid is responsive to said second output for controlling the amplification factor of said first amplifier to maintain said first amplified output at said threshold level, said second variable gain amplifier receiving said other signal at its control grid and developing an amplified output at its anode, and means for applying said second output to the suppressor grid of said second amplifier for controlling the amplification of said second amplifier whereby the output of said second amplifier corresponds to the ratio of the two signals.

3. A circuit for producing an electric signal corresponding to the quotient of a divisor and a dividend electric signal, comprising first and second substantially identical variable $\mu$ tubes, means for applying said dividend signal to said first tube to provide an electrical output, means for applying said divisor signal to said second tube to provide an electrical output, threshold means responsive to the electrical output of said second tube for varying the $\mu$ of said second tube electrically to maintain said output constant and vary said $\mu$ as a function of the reciprocal of the divisor signal, said last-named means also being arranged to vary the $\mu$ of said first tube electrically, whereby the output of said first tube corresponds to the quotient of said signals.

4. A circuit for producing an electric signal corresponding to the quotient of a divisor and a dividend electric signal, comprising first and second substantially identical electron devices with variable gain characteristics each having a plurality of control elements, means for applying the dividend signal to a control element of the first device to provide an electrical output, means for applying the divisor signal to a control element of the second device to provide an electrical output, threshold means responsive to the electrical output of the second device for varying the gain characteristics of the second device electrically by applying a direct current signal to another of the control elements of the second device to maintain the output of the second device constant and vary the gain characteristics of the second device as a function of the reciprocal of the divisor signal, the last-named means also being arranged to vary the gain characteristics of the first device electrically by applying a direct current signal corresponding to the first direct current signal to another of the control elements of the first device, whereby the output of the first device corresponds to the quotient of the signals.

References Cited in the file of this patent

UNITED STATES PATENTS

| | | |
|---|---|---|
| 1,869,209 | Mead | July 26, 1932 |
| 1,888,065 | Beverage | Nov. 15, 1932 |
| 1,916,129 | Schade | June 27, 1933 |
| 1,932,588 | Holden | Oct. 31, 1933 |
| 2,414,111 | Lyons | Jan. 14, 1947 |
| 2,419,852 | Owen | Apr. 29, 1947 |
| 2,425,405 | Vance | Aug. 12, 1947 |
| 2,471,262 | Cousins | May 24, 1949 |
| 2,480,842 | Farnsworth | Sept. 6, 1949 |
| 2,507,160 | Hugenholtz et al. | May 9, 1950 |
| 2,591,637 | Tilley | Apr. 1, 1952 |
| 2,634,339 | Bonadio | Apr. 7, 1953 |

FOREIGN PATENTS

| | | |
|---|---|---|
| 844,925 | Germany | July 28, 1952 |